United States Patent

Ohmi et al.

[11] Patent Number: 5,827,949
[45] Date of Patent: Oct. 27, 1998

[54] METHOD AND SYSTEM FOR MEASURING EXTERNAL LEAKAGE

[75] Inventors: Tadihiro Ohmi, Miyagi-ken; Atsushi Ohki, Saitama-ken; Yohichi Kanno, Miyagi-ken, all of Japan

[73] Assignee: Osaka Sanso Kogyo, Ltd., Osaka-Fu, Japan

[21] Appl. No.: 894,504

[22] PCT Filed: Feb. 24, 1995

[86] PCT No.: PCT/JP95/00284

§ 371 Date: Nov. 17, 1997

§ 102(e) Date: Nov. 17, 1997

[87] PCT Pub. No.: WO96/26426

PCT Pub. Date: Aug. 29, 1996

[51] Int. Cl.$^6$ .............................. G01M 3/04; G01N 7/00
[52] U.S. Cl. ............................. 73/40; 73/31.03; 73/40.7
[58] Field of Search .................... 73/40, 40.5, 31.01, 73/31.03, 40.7

[56] References Cited

U.S. PATENT DOCUMENTS 5,485,016  1/1996  Irie et al. ................................ 250/288

FOREIGN PATENT DOCUMENTS

54-109491  8/1979  Japan .............................. G01M 3/04
1-291142  11/1989  Japan .............................. G01N 1/22

Primary Examiner—Michael Brock
Assistant Examiner—Jay L. Politzer
Attorney, Agent, or Firm—Randall J. Knuth

[57] ABSTRACT

A method of measuring external leakage, which comprises the steps of introducing a first gas different from main component gasses of an external atmosphere into a pipe having a leak, adding $H_2$ gas (or $H_2$-containing gas) to the first has at a down-stream point, and measuring gas components entering from the external atmosphere of the leak by an atmospheric ionization mass spectrometer (atmospheric pressure ionization mass spectrometer) at a further downstream point (for example, $N_2H^+$ is detected when the external atmosphere is the $N_2$ gas). A method of measuring the external leakage of a gas supply piping line having a plurality of branch piping lines comprises the steps of introducing $H_2$ gas (or a $H_2$-containing gas) into at least one of the branch piping lines, introducing a first gas different from main component gases of an external atmosphere into the rest of the branch piping lines, and measuring gas components entering from the external atmosphere by the atmospheric pressure ionization mass spectrometer at a downstream point of the branch portion. The present invention can measure the external leakage very simply and with high levels of sensitivity and accuracy. Particularly, the present invention can be suitable applied to the cases where an inspection portion is elongated or branched such as feed pipe of a semiconductor plant.

14 Claims, 9 Drawing Sheets

METHOD AND SYSTEM FOR MEASURING EXTERNAL LEAKAGE

SPECIFICATION

1. Technical Field

The present invention relates to a method and system for measuring external leakage.

2. Background Art

In a gas supply piping system, a vacuum apparatus, etc. in a semiconductor fabrication system etc. requiring high purity gases and a highly-clean atmosphere, an external leakage must be prevented with all efforts. An external leakage arises usually at a connecting portion of parts, and to prevent it, there have been considered welding techniques and joint methods which do not lead to an external leakage. As a result, there has been established a technique in which an external leakage is less than the limit of detection of the present He leak-detector.

However, even if component parts and connecting techniques have been improved, contaminants may be caught between the parts when the system is constructed, or defective parts can not be avoided perfectly. Accordingly, as a matter of fact, an external leakage is inspected after construction of a fabricating process, to confirm security of the process.

As a method of measuring an external leakage, there is one using the above-described He leak-detector. In this method, the inside of piping etc. to be measured should be highly evacuated, and a point to be inspected should be bagged and blown by He gas, which requires a great deal of time and labor. Particularly, the longer the line to be measured is, the greater the required time and labor become. Further, its sensitivity is not so good, which is another drawback.

The present invention provides a method and system for measuring external leakage, which can obviate the above-described problems of the conventional method of measuring an external leakage, can measure simply, and have good sensitivity.

DISCLOSURE OF THE INVENTION

Briefly speaking, to obviate the above-described problems, a method of measuring an external leakage, according to a first gist of the present invention, comprises the steps of: introducing a first gas different from main component gases of an external atmosphere around the portion where the external leakage should be measured into the inside of that portion; adding $H_2$ gas (or an $H_2$ containing gas) to the first gas at a point downstream from that portion; and measuring gas components entering from the external atmosphere around said portion where the external leakage should be measured, by an atmospheric pressure ionization mass spectrometer at a point downstream from the $H_2$ gas adding point.

According to a second gist of the invention, a method of measuring an external leakage in a gas supply piping line having a plurality of branch piping lines comprises steps of: introducing $H_2$ gas (or a $H_2$-containing gas) into at least one of the branch piping lines; introducing a first gas different from main component gases of an external atmosphere into the rest of the branch piping lines; and measuring gas components entering from the external atmosphere by an atmospheric pressure ionization mass spectrometer at a point downstream from the branch portion.

According to the third gist of the invention, a method of measuring an external leakage comprises steps of: letting the inside of a portion where the external leakage should be measured be under lower pressure relatively to an external atmosphere; introducing, then, a first gas different from main component gases of the external atmosphere into the inside from a point downstream or upstream from the above-mentioned portion up to given pressure; and introducing the above-mentioned first gas to an atmospheric pressure ionization mass spectrometer to measure gas components entering from the external atmosphere at said portion where the external leakage should be measured, by the atmospheric pressure ionization mass spectrometer.

According to fourth gist of the invention, a system for measuring an external leakage comprises: a gas supply source for introducing a first gas into the inside of a portion where the external leakage should be measured; an $H_2$ gas adding source for adding $H_2$ gas (or a $H_2$-containing gas) to the first gas at a point downstream from the above-mentioned portion where the external leakage should be measured; and an atmospheric pressure ionization mass spectrometer, installed downstream from the gas adding point, for measuring gas components entering from the outside at the portion where the external leakage should be measured.

According to a fifth gist of the invention, a system for measuring an external leakage of a gas supply piping line having a plurality of branch piping lines comprises: an $H_2$ gas supply source for introducing $H_2$ gas (or a $H_2$-containing gas) into at least one of the plurality of branch piping lines; a first gas supply source for introducing a first gas different from main component gases of an external atmosphere into the rest of the branch piping lines; and an atmospheric pressure ionization mass spectrometer installed downstream from the branch portion for measuring gas components entering from the external atmosphere.

According to the present invention, gas components of an external atmosphere included in a first gas which has passed through a portion where an external leakage should be measured is measured by an atmospheric pressure ionization mass spectrometer(APIMS) having high sensitivity of measuring, and further, $H_2$ gas is added before APIMS, so that the detection sensitivity is further improved and it becomes possible to detect an extremely small amount of the gas components of the external atmosphere which has entered from the outside due to leakage.

Next, there will be described investigations made by the inventors to obviate the drawbacks of the method of measuring an external leakage using an He leak-detector, in the process of completing the present invention. Also, the operation of the present invention will be described more detailedly.

(Experiment 1)

Figure 1:
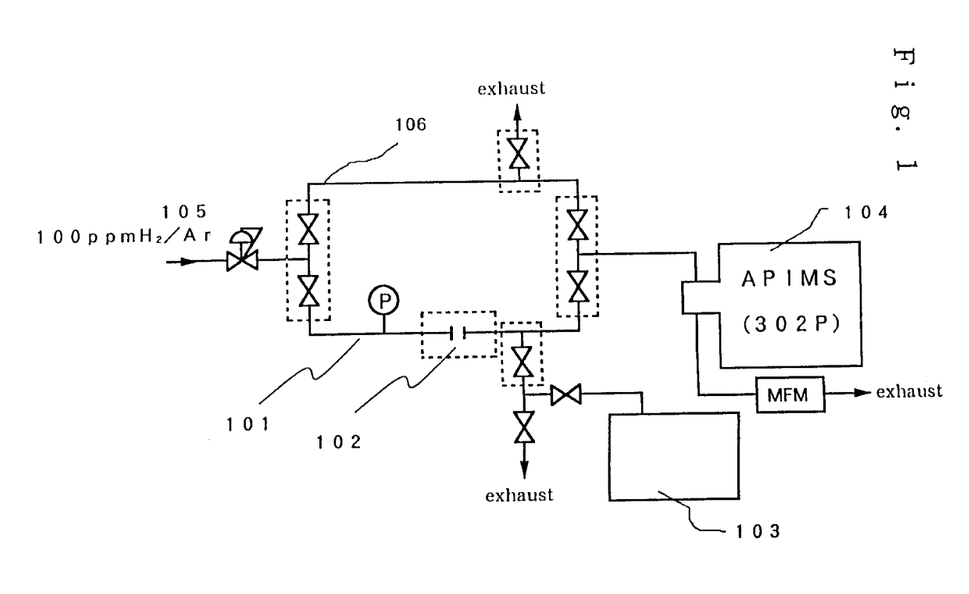
FIG. 1 is a schematic view showing an example of an evaluation system for an external leakage.

In the present experiment, based on findings that detection sensitivity of an APIMS for a small amount of nitrogen gas is extremely increased by adding $H_2$ gas to have $N_2H^+$ (m/z=29), an evaluation system shown in FIG. 1 was constructed to try to measure an external leakage.

In the evaluation system of FIG. 1, pipes (¼") treated by the electrolytic polishing were used for all the piping, and all the parts used were all-metal parts treated by the electrolytic polishing. In the middle of a pipe line 101 where the external leakage was to be measured, a leak point 102 was formed using an MCG (metal C-ring) joint.

First, the external leakage was measured using an He leak-detector 103. That measurement was performed by reducing the pressure inside the pipe line to $10^{-5}$ Torr, covering the leak portion with a vinyl bag, and filling the inside of the vinyl bag with He gas. Further, the He leak-detector 102 was calibrated by using a standard leak bomb ($9.5 \times 10^{-7}$ atm·cc/sec, 20° C.).

Next, $H_2$/Ar gas ($H_2$: 100 ppm, $O_2$: 10 ppt or less, $N_2$: 10 ppt or less, $CO_2$: 10 ppt or less, $H_2O$: 10 ppt or less) 105 introduced from a high purity Ar piping line and $H_2$ piping line (not shown) was supplied into the leak point 102 at a flow rate of 10 cc/min and a pressure of 0.1 kg/cm² (G). Amounts of $N_2$ and $O_2$ components entered from the outside, included in the $H_2$/Ar gas which had passed through the leak point, was measured by APIMS 104.

Figure 2:
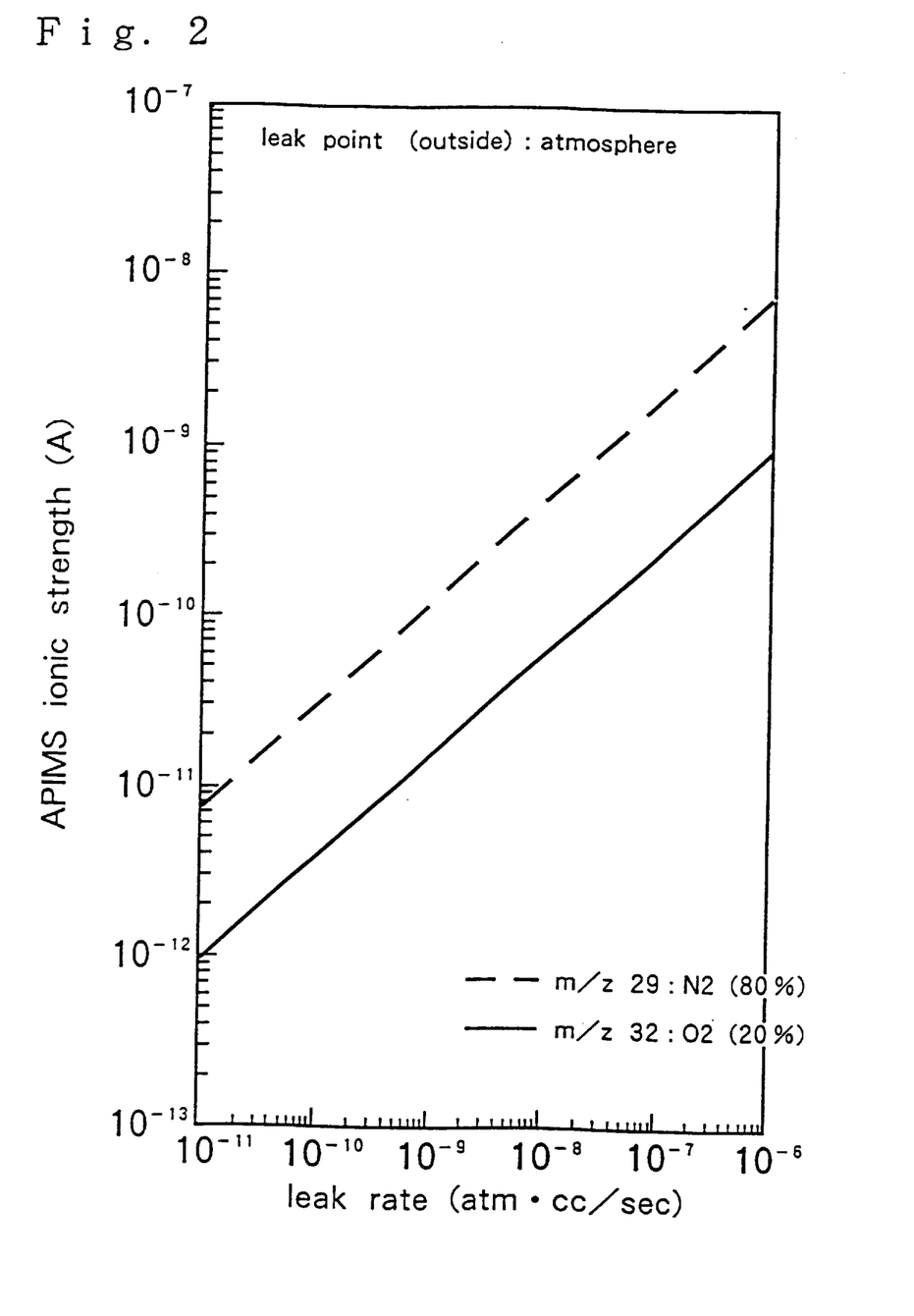
FIG. 2 is a graph showing results of measurement of external leakage using the evaluation system of FIG. 1.

FIG. 2 shows a relation between external leakage at the leak point 102 and detected strengths by APIMS 104. As clearly seen from FIG. 2, the evaluation system of FIG. 1 can detect and determine an external leakage of $10^{-11}$ atm·cc/sec or more. Further, in this method, operations such as vacuuming, bagging with a vinyl bag, and filing of He gas are not required, and it is possible to measure an external leakage simply and in a short time.

However, gas piping lines in, for example, a semiconductor plant branches to many lines, and, sometimes, length of each branch pipe line extends to hundreds through a thousand meters. In that case, when all the branch pipe lines are to be measured by the above-described method, an $H_2$/Ar gas bomb should be connected to a terminal end portion of each branch pipe line to supply the gas. In fact, carrying out the above-described measurement in such a system, it was found that sensitivity and accuracy of measurement were extremely lowered, and the expected result could not be obtained.

To elucidate the cause, various investigations were carried out, one of which is the next experiment.

(Experiment 2)

Figure 3:
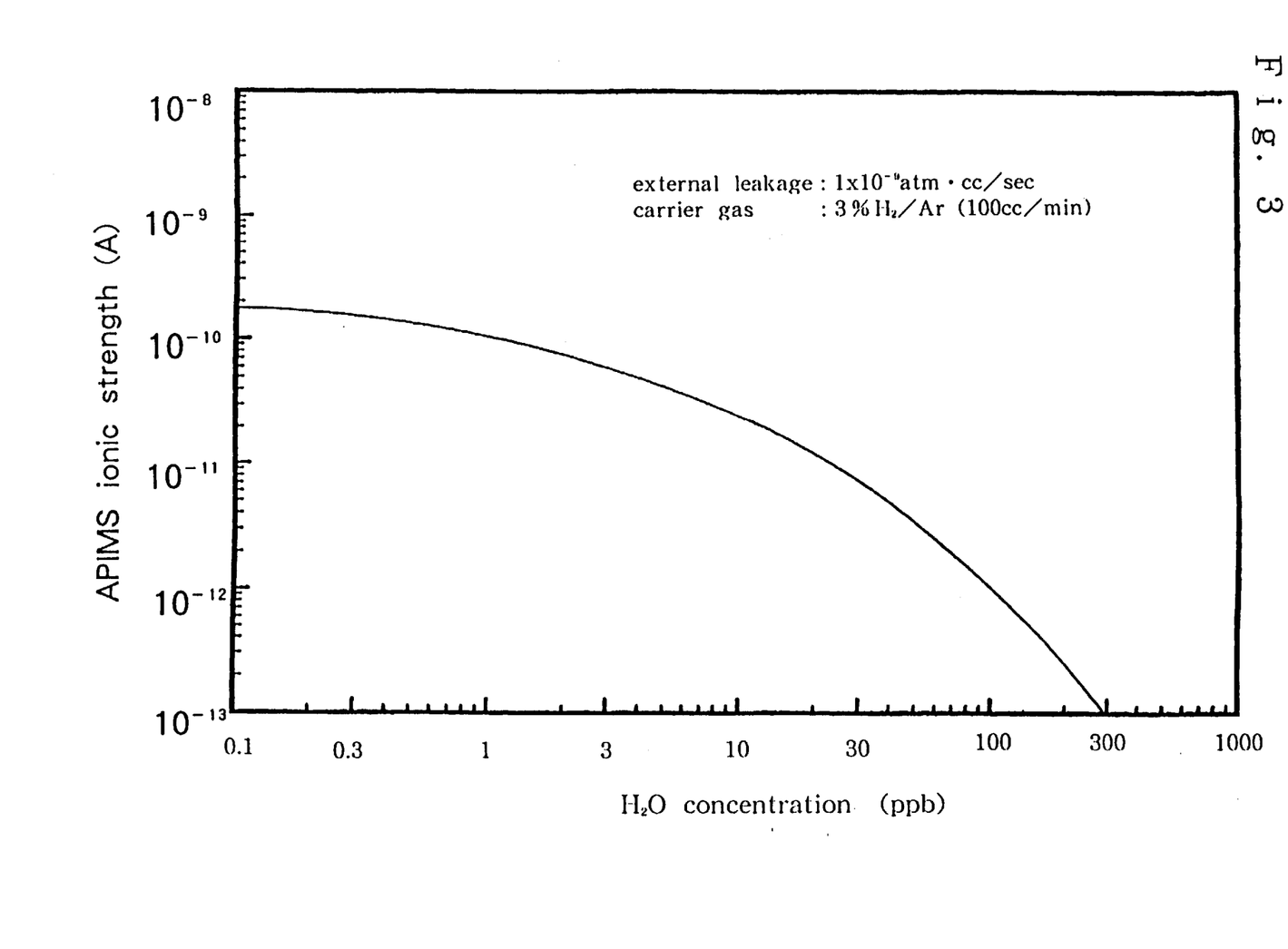
FIG. 3 is a graph showing effects of water on sensitivity of measurement.

Using the evaluation system of FIG. 1, and $H_2$/Ar gases added with $H_2O$ at various concentrations, an external leakage was measured similarly to Experiment 1. FIG. 3 shows a relation between peak ionic strength of $N_2H^+$ (m/z=29) in the atmospheric pressure ionization mass spectrometer and $H_2O$ concentration.

As seen from FIG. 3, it is found that ionic strength falls along with $H_2O$ concentration, and an extremely small amount of $H_2O$ makes it difficult to measure with high accuracy and high sensitivity. Namely, it has been found that, at present, it is difficult to completely remove water adhering to the inside wall of a gas bomb, so that a small amount of water is contained in the gas, and this water prevents accurate measurement. Accordingly, when a gas bomb is used, it is necessary to refine the gas to high purity one through a gas refining device. However, providing two refining devices for $H_2$ gas and Ar gas respectively at each gas supply point of many branch pipe lines leads to rise in construction cost and a number of man-hour.

(Experiment 3) Then, $H_2$ gas and Ar gas were refined through a pair of refining devices respectively and mixed to obtain $H_2$/Ar gas, and the latter was supplied to each supply point by constructing supply piping, to perform the above-described measurement. As a result, it was found that the expected result can not be obtained, similarly to the case of using a gas bomb. Following experiment showed that this was caused by water adhering to the inside of supply piping.

Figure 6:
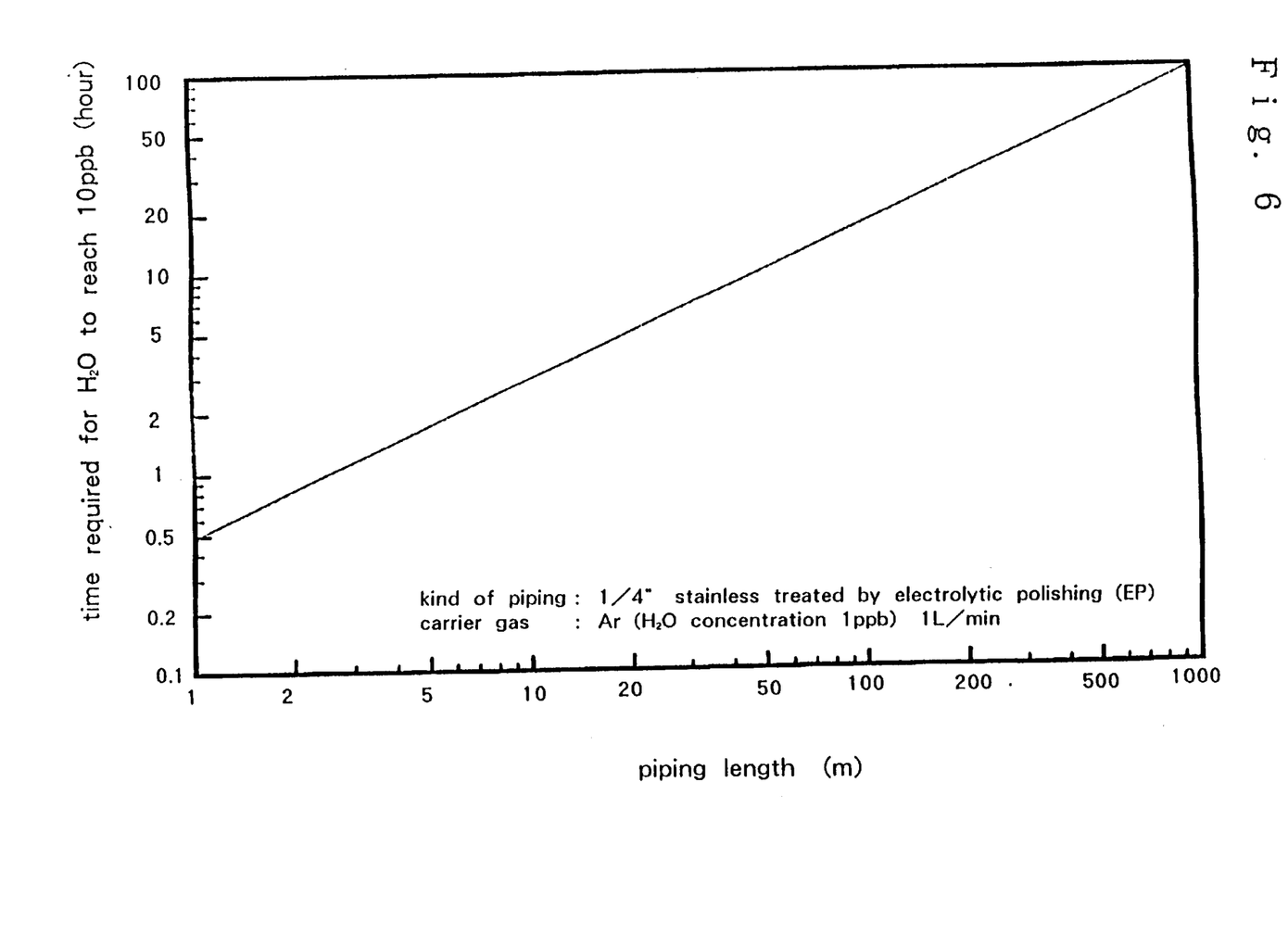
FIG. 6 is a graph showing a relation between length of piping to be inspected and time required for water content of a gas to become 10 ppb at an exit of the piping to be inspected.

Namely, Ar gas (water content of 1 ppb) was introduced inside the supply piping, and concentration of water content was measured at an exit of the supply piping, and relation between time required for water content to become 10 ppb or less and length of the piping was investigated, the results being shown in FIG. 6. Namely, when the length of the supply piping becomes larger, high sensitive measurement becomes difficult because of desorption of water content adsorbed to the inside of piping. For example, when the piping is 1000 m, the inside of the piping should be purged with high purity gas for as long as 100 hours.

The present invention has been completed based on the above findings. Namely, by introducing high purity Ar gas, which can be used easily at any point, into piping to be investigated, and adding $H_2$ gas in the neighborhood of an APIMS or introducing $H_2$ gas into one of branch pipe lines, it is possible to measure gas components which has leaked from the outside to enter the piping with high sensitivity and high accuracy.

For example, even when a gas bomb is to be used, refined $H_2$ gas may be introduced into one of branch piping lines, and refined Ar gas is introduced to the rest of the branch piping lines, to perform measurement. In that case, the number of the required gas refining devices is almost half of the above-described case.

Or, construction of piping is carried out while Ar gas is made to flow inside the piping, and therefore, the high purity Ar gas can be used at any point. Therefore, it is possible to measure an external leakage simply and in a short time, by refining $H_2$ gas from an $H_2$ gas bomb through a refining device to supply it to one of branch pipe lines, and introducing the high purity Ar gas supplied through the piping to the rest of the branch pipe lines. In that case, if there exits high purity $H_2$ gas piping, it can be used, of course.

In the present invention, as the first gas introduced into the inside of the portion where an external leakage should be measured, there may be used any gas such as $CH_4$, $CCl_2F_2$, or the like, other than the gas components where leaks from the outside to enter the piping and should be detected by the APIMS. In particular, when the outside is the atmosphere, Ar gas, He gas, or the like can be used suitably. Further, as the $H_2$ gas added to the first gas, $H_2$ gas itself may be used or one diluted with Ar gas etc. may be used. Further, as the concentration of $H_2$ gas introduced to APIMS, 0.1% or more is preferable from the viewpoint of detection sensitivity. Further, as water contents of these gases, 10 ppb or less is preferable.

When an external leakage is found in the present invention, to locate a leakage point, a gas different from others may be used only as the external atmosphere at the measuring portion, and that gas component may be measured by the APIMS.

As described above, sensitivity and accuracy of measuring an external leakage are affected greatly by $H_2O$, and therefore water content of a gas to be used should be suppressed as largely as possible. Further, to remove an effect of water etc. adsorbed by the inside of the piping to be inspected, it is preferable to introduce a high purity gas in advance before measurement, to remove adsorbed water.

Further, in the system itself for measuring an external leakage, it is preferable to use piping, valves, or the like formed, at the inside, with chromium oxide passivation film whose adsorption of water is small and desorption prompt. To form the chromium oxide passivation film at the inside surface of, for example, a stainless steel pipe, the inside surface of the pipe is treated by the electrolytic polishing and heated to 550° C. in an oven, and a weak oxidizing gas (Ar gas containing 10% of $H_2$ and 5 ppm of $O_2$) is introduced into the inside of the pipe, thus obtaining the passivation film.

Of course, the present invention is not limited to gas supplying piping, and can be applied for any device or equipment in which an leakage is a problem, such as a vacuum apparatus or a pressure reducing device.

The reference numerals 101, 401 and 701 refers to piping to be inspected, 102, 402 and 702 to leak points, 103, 403 and 703 to He leak-detectors, 104, 404 and 708 to APIMS, 105 and 405 to first gases, 106, 406 and 709 to bypass lines, and 407, 704, 705, 706 and 707 to valves.

BEST MODE FOR CARRYING OUT THE INVENTION

The present invention will be described in more detail, referring to embodiments in the following.

(Embodiment 1)

Figure 4:
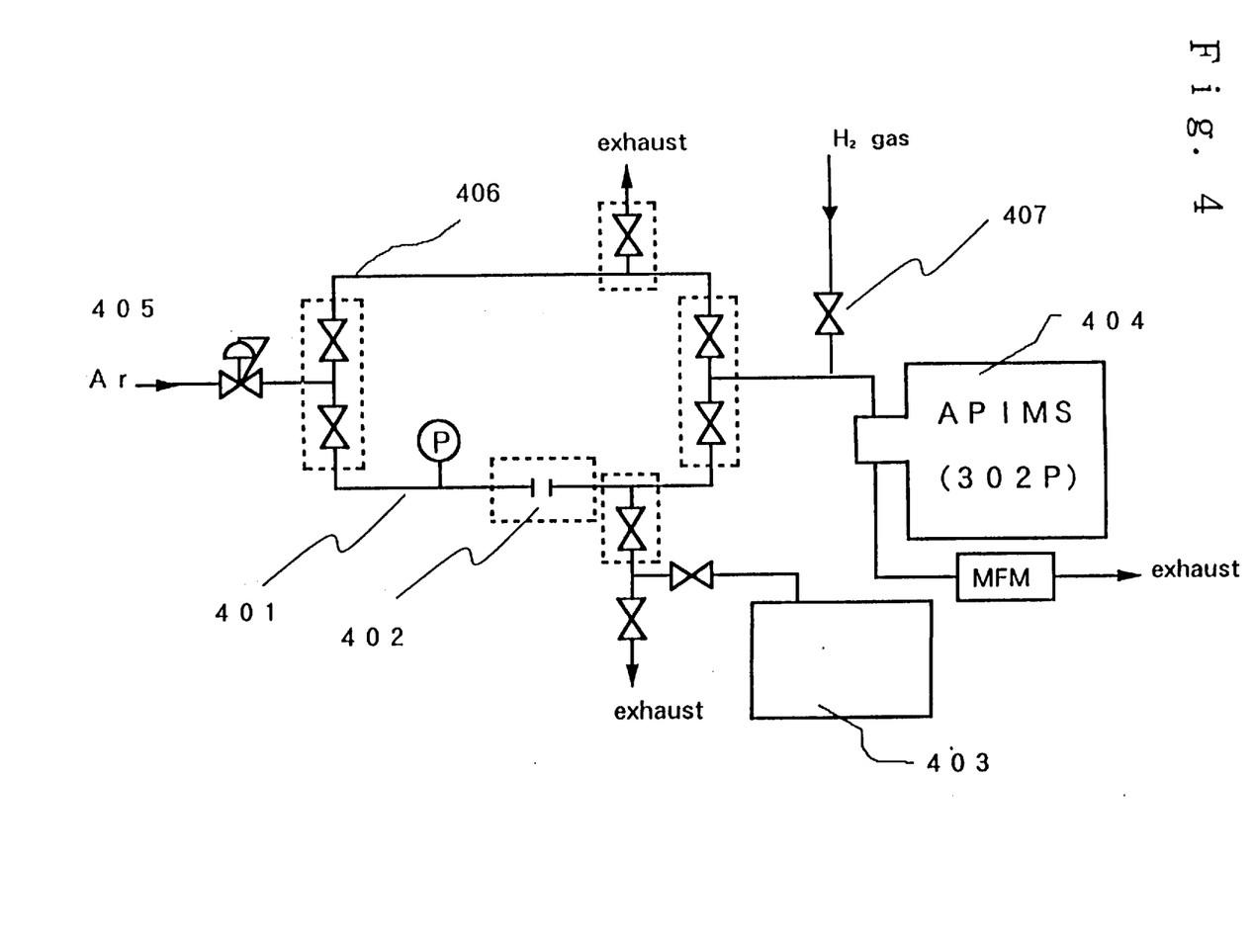
FIG. 4 is a schematic view showing an evaluation system for an external leakage according to Embodiment 1.

An external leakage was measured similarly to Experiment 1 except that an evaluation system shown in FIG. 4 of the present embodiment was used, and Ar gas ($O_2$: 10 ppt or less, $N_2$: 10 ppt or less, $CO_2$: 10 ppt or less, and $H_2O$: 10 ppt or less) was introduced at flow rate of 10 cc/min and pressure of 0.1 kg/cm$^2$ (G). $H_2$ gas was added through a valve 407 in such a manner that concentration of the $H_2$ gas in a gas introduced to APIMS becomes 1%.

Figure 5:
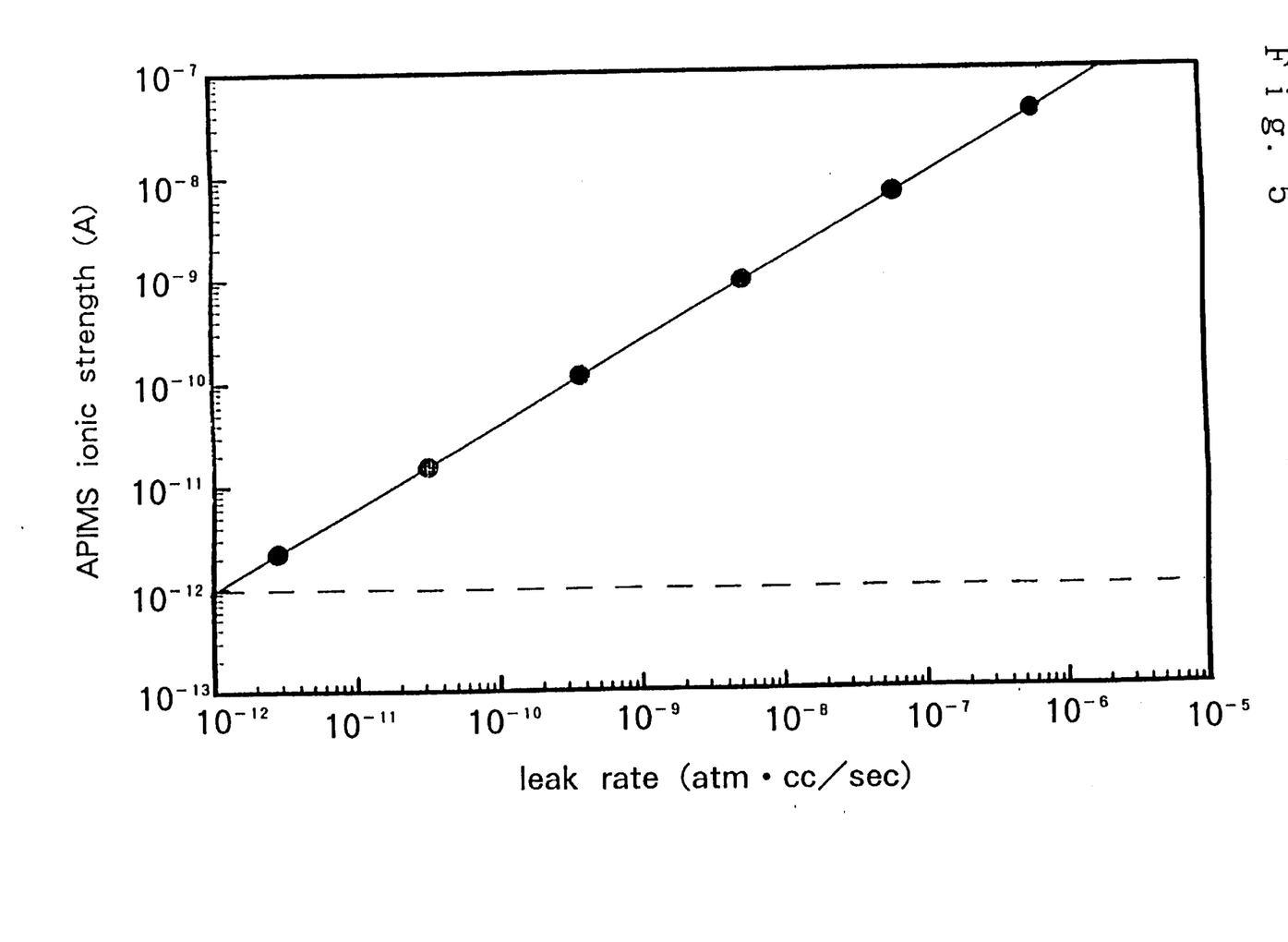
FIG. 5 is a graph showing a relation between an external leakage and detection sensitivity.

A relation between an external leakage and $N_2H^+$ peak strength was the same as FIG. 2, and it was found that high sensitive measurement was possible in the construction of the present embodiment. Further, it was found that, by changing the detection system of the APIMS from conventional analogue type to digital type, detection sensitivity was further improved, as shown in FIG. 5.

(Embodiment 2)

In the present embodiment, pressure of the Ar gas flowing inside the leak point 402 of Embodiment 1 was changed to 0.1 kg/cm$^2$ (G), and pressure change was made to be 0.1–3.0 kg/cm$^2$ (G), to evaluate the detection sensitivity of the atmospheric pressure ionization mass spectrometer for pressure of the Ar gas. It was found that, for attaining higher detection sensitivity, the lower the pressure of the Ar gas is, the higher the detection sensitivity is. However, for practical use, 5 kg/cm$^2$ or less is preferred, 3 kg/cm$^2$ or less further preferred, and 1 kg/cm$^2$ or less most preferred.

(Embodiment 3)

In the present embodiment, there was used a vacuum method in which inside of a portion where an external leakage was to be measured was evacuated before measurement of the external leakage. FIG. 5 shows a relation between an external leakage at a leakage point and detection sensitivity in the atmospheric pressure ionization mass spectrometer measurement device.

Figure 7:
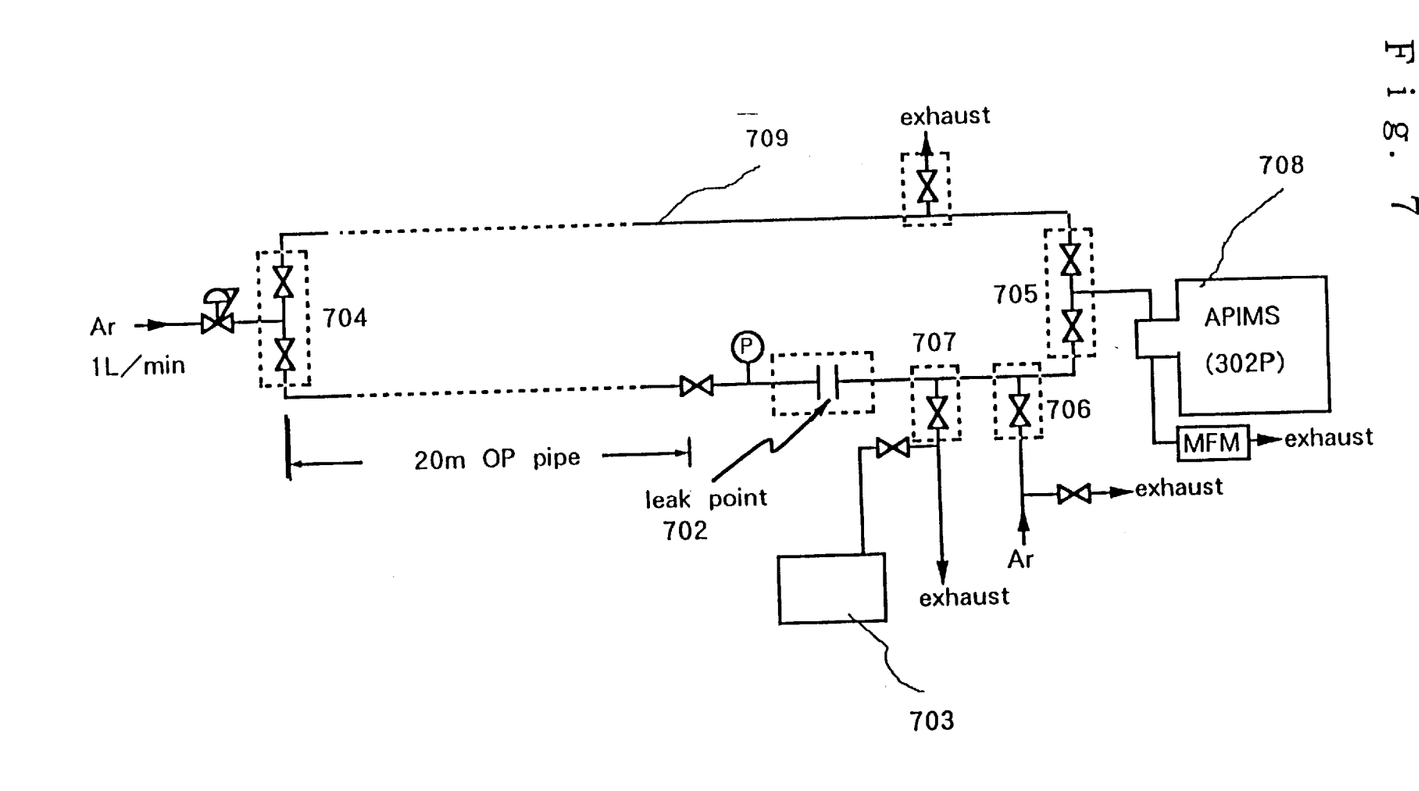
FIG. 7 is a schematic view showing an evaluation system for an external leakage according to Embodiment 3.

FIG. 7 shows a schematic view of an evaluating system used in the present embodiment. All the parts used in the evaluation system are made of stainless steel which is treated by the electrolytic polishing and thereafter formed with chromium oxide passivation film.

First, as in Embodiment 1, an leakage at a leak point 702 which was made by an MCG joint was measured by an He leak-detector 703. The leakage at the leak point 702 was 5×10$^{-9}$ atm·cc/min. Here, as the He leak-detector 703, one calibrated with a standard leak bomb (9.5×10$^{-7}$ atm·cc/sec, 20° C.) was used.

Next, as for the leak point 702, the valves 704 and 705 was closed, and evacuation was carried out by the He leak-detector 703 through the valve 707. Then, the valve 707 was closed again, and the inside of the leak point 702 was kept in vacuum condition. Degree of vacuum was made to be 30 Torr, and vacuum keeping time 8 hours.

Successively, Ar gas was introduced through the valve 706 to a portion where an external leakage was to be measured, and left to stand 10 minutes. At that time, the pressure of the Ar gas at the portion where the external leakage was to be measured was made to be 4 kg/cm$^2$.

Last, the Ar gas held inside the portion where the external leakage was to be measured was introduced to APIMS. The rate of introducing the Ar gas to the APIMS was 1 L/min. At the time when the pressure of the Ar gas held inside the portion where the leakage was to be measured became the atmospheric pressure, the valve 704 was opened, and the Ar gas was supplied at 1 L/min so that the residual Ar gas inside the piping was completely introduced to the APIMS. However, the Ar gas could always be supplied through a bypass line 709 to always keep the APIMS clean.

Figure 8:
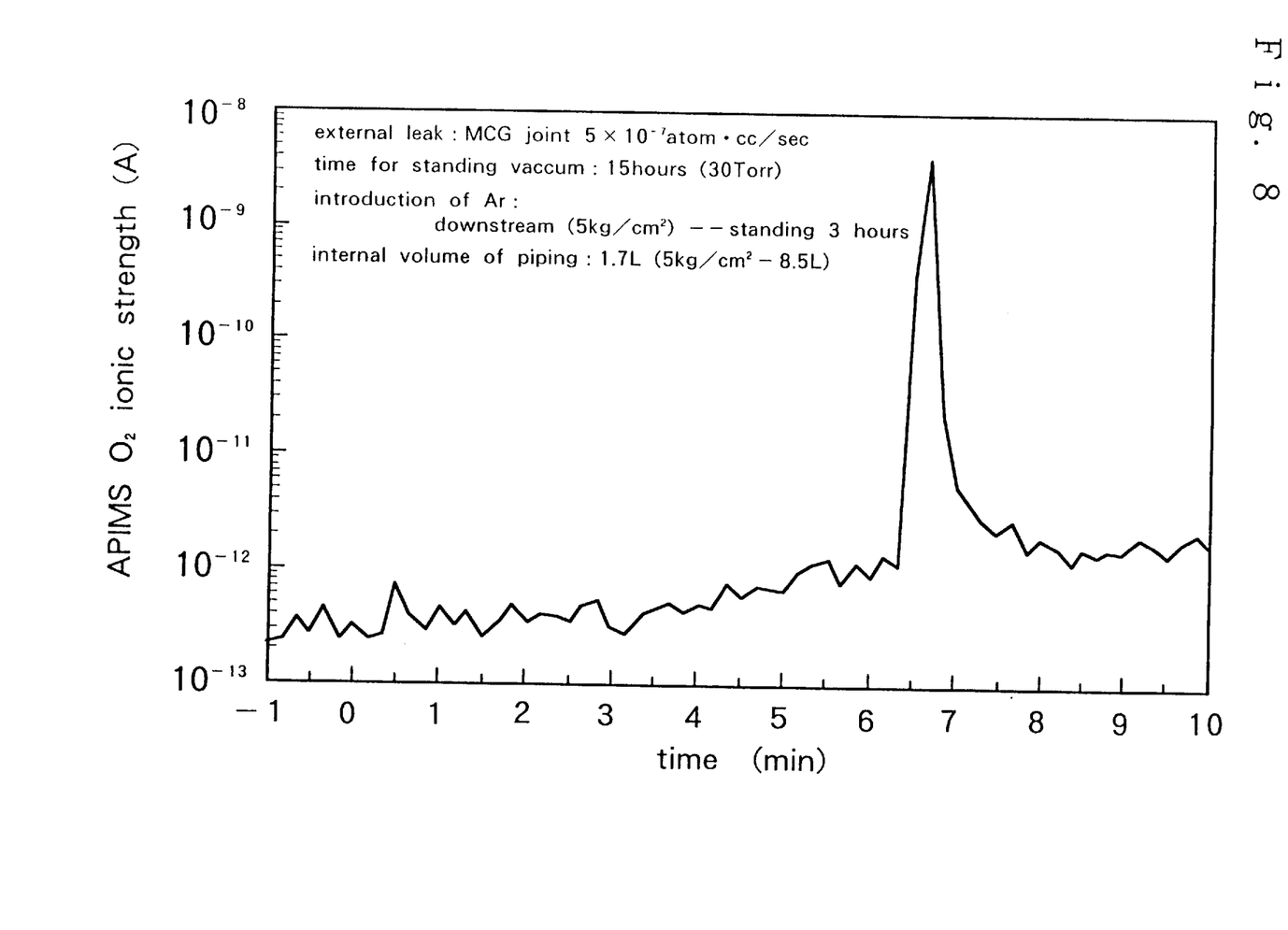
FIG. 8 is a graph showing a change of $O_2$ ionic strength over time in Embodiment 3.

FIG. 8 shows an APIMS chart as a result of this measuring. The abscissa of FIG. 8 shows the time elapsed from introducing of the Ar gas held inside the portion where the leakage was to be measured to the APIMS. The ordinate shows $O_2$ strength detected by APIMS. As seen from FIG. 8, in about 6.5 minutes from the start of the measuring, a large amount of $O_2$ component was detected instantaneously. Accordingly, it is found that the atmospheric component which entered from the portion where the leakage was measured while it was kept in vacuum condition was condensed at the terminal end (neighborhood of the valve 704) downstream from the introduction portion 706 of the Ar gas.

According to the above-described method, it is possible to practically improve sensitivity of measuring.

(Embodiment 4)

Figure 9:
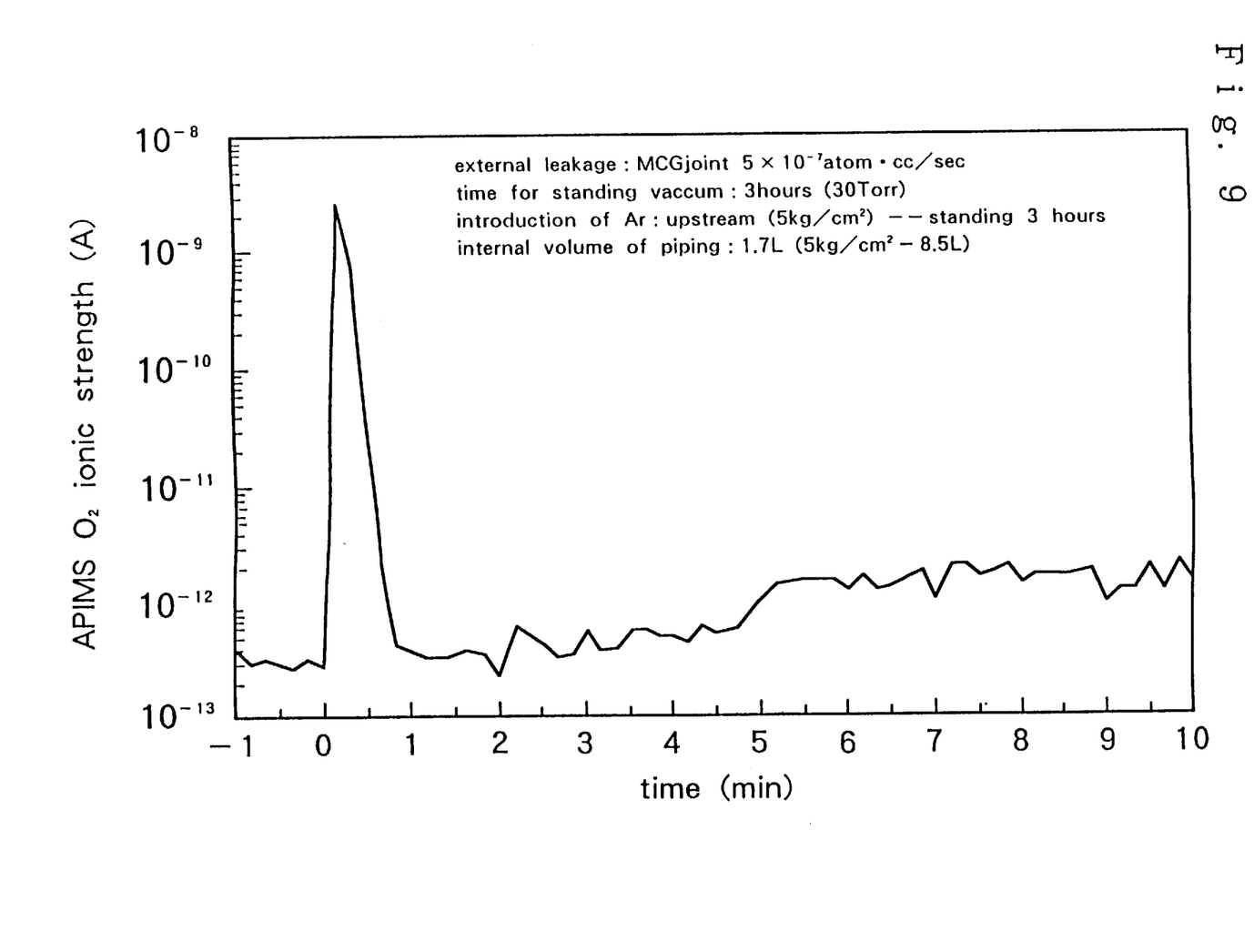
FIG. 9 is a graph showing a change of $O_2$ ionic strength over time in Embodiment 4.

In the present embodiment, after keeping in vacuum condition in Embodiment 3, the Ar gas was introduced into the leak point 702 through the valve 704. Except that, it was same as Embodiment 3. As seen from FIG. 9, in 10 seconds from the start of the measuring, a large amount of $O_2$ component was detected instantaneously. Accordingly, it is found that the atmospheric component which entered from the portion where the leakage was measured while it was kept in vacuum condition was condensed at the terminal end (neighborhood of the valve 705) downstream from the introduction portion 704 of the Ar gas.

In Embodiments 3 and 4, as a gas component which enters into the inside from the external atmosphere, $O_2$ gas was used to measure an external leakage. It, however, was confirmed that, when $N_2$ gas was used instead of $O_2$ gas, sensitivity can be improved practically, too.

Industrial Applicability

According to the present invention, it is possible to measure an external leakage extremely simply with high level of sensitivity and accuracy. Particularly, the present invention can be applied suitably to the case where a portion to be inspected is long and/or branched such as in gas supply piping of a semiconductor plant.

We claim:

1. A method of measuring an external leakage about a portion of a vessel, comprising the steps of:

flushing a first gas different from an external atmosphere around a portion where the external leakage should be measured, into an inside of said portion;

adding gas containing hydrogen to said first gas at a point adjacent from said portion; and measuring a gas component entering from the external atmosphere around said portion where the external leakage should be measured, by an atmospheric pressure ionization mass spectrometer at a point downstream from said point where the gas containing hydrogen was added.

2. The method of claim 1 in which said gas containing hydrogen is added upstream from said portion.

3. The method of claim 1 in which said gas containing hydrogen is added downstream from said portion.

4. The method of measuring an external leakage according to claim 1, wherein the water content of a gas introduced to said atmospheric pressure ionization mass spectrometer is 10 ppb or less.

5. The method of measuring an external leakage according to claim 1, wherein said gas component entering from the external atmosphere is nitrogen gas.

6. The method of measuring an external leakage according to claim 1, wherein said gas containing hydrogen is greater than or equal to 0.1% of a gas introduced to said atmospheric pressure ionization mass spectrometer.

7. A method of measuring an external leakage in a gas supply piping line having a plurality of branch piping lines, comprising steps of:

flushing gas containing hydrogen into at least one of the branch piping lines;

introducing a first gas different from an external atmosphere into the rest of the branch piping lines; and measuring a gas component entering from an external atmosphere by an atmospheric pressure ionization mass spectrometer at a point downstream from a branch portion.

8. The method of measuring an external leakage according to claim 7, wherein the water content of a gas introduced to said atmospheric pressure ionization mass spectrometer is 10 ppb or less.

9. The method of measuring an external leakage according to claim 7, wherein said gas component entering from the external atmosphere is nitrogen gas.

10. The method of measuring an external leakage according to claim 7, wherein said gas containing hydrogen is greater than or equal to 0.1% of a gas introduced to said atmospheric pressure ionization mass spectrometer.

11. A method of measuring an external leakage of a conduit portion, comprising steps of:

lowering the pressure inside of a conduit portion where the external leakage should be measured relative to an external atmosphere;

introducing a first gas different from the external atmosphere into the inside from a point one of downstream or upstream from said portion;

adding a gas containing hydrogen at a point up stream from an atmospheric pressure ionization mass spectrometer;

introducing said first gas to the atmospheric pressure ionization mass spectrometer to measure a gas component entering from the external atmosphere at said portion.

12. A system for measuring an external leakage of portion of a vessel, the system comprising:

a gas supply source for introducing a first gas into an inside of a portion of the vessel where the external leakage should be measured;

a gas adding source for adding gas containing hydrogen to said first gas at a point downstream from said portion where the external leakage should be measured; and an atmospheric pressure ionization mass spectrometer, installed downstream from said point at which the gas containing hydrogen is added, for measuring a gas component entering from the outside at the portion where the external leakage should be measured.

13. A system for measuring an external leakage of a gas supply piping line having a plurality of branch piping lines, said system comprising:

a gas supply source for introducing gas containing hydrogen into at least one of said plurality of branch piping lines, a first gas supply source for introducing a first gas different from an external atmosphere into the rest of the branch piping lines; and an atmospheric pressure ionization mass spectrometer installed downstream from a branch portion for measuring a gas component entering from the external atmosphere into the gas supply piping line.

14. The system for measuring an external leakage according to claim 13, wherein parts contacting said first gas are formed with a chromium oxide passivation film.

* * * * *

UNITED STATES PATENT AND TRADEMARK OFFICE
CERTIFICATE OF CORRECTION

PATENT NO. : 5,827,949
DATED : October 27, 1998
INVENTOR(S) : Ohmi, et al.

It is certified that error appears in the above-identified patent and that said Letters Patent is hereby corrected as shown below:

On the title page item [75],

"Tadihiro Ohmi" should read --Tadahiro Ohmi--.

Signed and Sealed this

Twenty-second Day of August, 2000

Attest:

Q. TODD DICKINSON

*Attesting Officer*        *Director of Patents and Trademarks*